Oct. 27, 1925.
A. W. CHRISTIE
PROCESS OF BLEACHING NUTS
Filed April 30, 1925
1,558,963
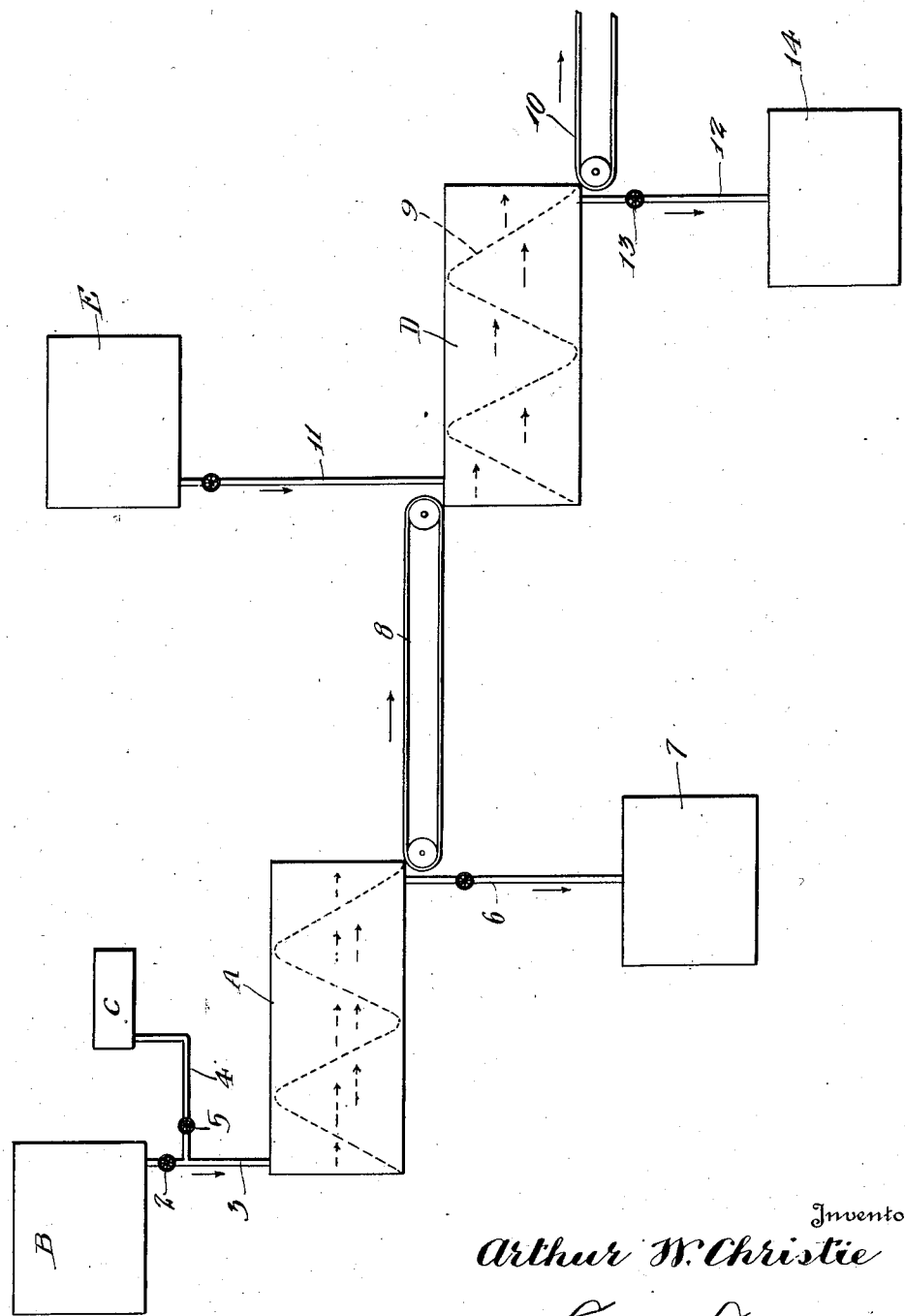
Inventor
Arthur W. Christie
By Lyon & Lyon
Attorneys Patented Oct. 27, 1925.

1,558,963

UNITED STATES PATENT OFFICE.

ARTHUR W. CHRISTIE, OF BERKELEY, CALIFORNIA, ASSIGNOR TO CALIFORNIA WALNUT GROWERS ASSOCIATION, OF LOS ANGELES, CALIFORNIA, A CORPORATION OF CALIFORNIA.

PROCESS OF BLEACHING NUTS.

Application filed April 30, 1925. Serial No. 26,859.

*To all whom it may concern:*

Be it known that I, ARTHUR W. CHRISTIE, a citizen of the United States, residing at Berkeley, in the county of Alameda and State of California, have invented a new and useful Process of Bleaching Nuts, of which the following is a specification.

This invention relates to a process of bleaching nuts and is more particularly directed to an improved process for bleaching walnuts.

Various processes have been used and are now in use for the bleaching of nuts, particularly walnuts, which processes are, for the most part, dependent upon the bleaching action of nascent chlorine. These processes, however, do not produce a satisfactory bleach and do not bleach all of the nuts so treated uniformly.

I have discovered that very satisfactory results are obtained by treating nuts, particularly walnuts, first with a solution from which nascent chlorine is liberated during the primary bleaching step, and, secondly, by treating the product from this primary step with a solution of sulphurous acid and that this process, as briefly stated, produces a uniform, bleached product without regard to the condition of color and the like of nuts prior to their treatment.

An object of this invention is, therefore, to provide a process for bleaching nuts which will provide a uniform and satisfactorily bleached product.

Other objects and advantages of my invention will be apparent from the following detailed description thereof, reference being had to the accompanying diagrammatic drawing.

The preferred embodiment comprises the following steps, the first step of which consists of introducing a chlorine-containing or liberating solution into a revolving drum through which the nuts to be bleached are conveyed by any suitable means, such as the conveyors which are diagrammatically illustrated. Any solution may be used for the purpose of providing the requisite active or nascent chlorine such as is obtained by the treatment of a hypochlorite with an acid, or the like, any one of which will produce a high concentration of active chlorine. Because of ease in preparation and the ease in handling thereof, the following method is preferred for the production of the requisite chlorine:

Twenty-five pounds of chloride of lime (calcium hypochlorite) are dissolved in twenty-five gallons of cold water by first making a thick paste of the chloride of lime with a small portion of cold water in approximately a fifty gallon container. The container is then filled approximately half full of cold water and the same thoroughly stirred to dissolve the chloride of lime.

A solution is in the meantime prepared of six pounds of sodium carbonate mono hydrate crystals using sufficient water so that the crystals will be thoroughly dissolved by stirring. The two solutions are then poured together and the barrel filled with cold water.

The solution is then allowed to stand for approximately twenty-four hours to allow the precipitated calcium carbonate to settle. An acid solution of approximately eight fluid ounces of commercial concentrated sulphuric acid is added to five gallons of water. The solution of chloride of lime and sodium carbonate mono hydrate crystals is allowed to settle in the tank B. The solution of acid is contained in the tank C which is preferably lined of porcelain or like material.

In many cases it is preferable to obtain the requisite active chlorine from the method which depends on the preparation of a solution of sodium hypochlorite by passing chlorine gas into a solution of sodium hydroxide; which method of forming the desired bleaching solution to provide nascent chlorine of high concentration is well understood in the art.

The valve 2 connected in the line 3 above the entrance of the line 4 from the tank C is regulated as is the valve 5 in the line 4 so as to mix the solution from the tank B commonly termed the lime solution, with the acid solution from the tank C in the proportions of fifteen parts of lime solution to one part of acid solution. The solution is then admitted in the entrance end of the revolving drum A and flows through the revolving drum in the direction indicated by the arrows and exhausts through a valved line 6 to a waste solution tank 7. In many instances it may be preferable to merely dip the walnuts into this solution of fifteen parts of lime solution to one part of acid solution.

The nuts leaving the drum A or after having been dipped into the mixed acid and lime solution, are conveyed as diagrammatically illustrated at 8 to a second revolving drum D which likewise has veins 9 for conveying the nuts from the entrance end therethrough. The nuts leaving the drum D are delivered upon a second conveyor 10 and thereafter dried. The nuts are preferably dried in slatted bins (not shown) thereby permitting further action of the sulphurous acid solution absorbed by and mechanically held by the shells of the nuts.

The tank E contains a solution of sulphurous acid prepared either by the use of sulphur dioxide gas or the burning of sulphur to produce sulphur dioxide or by any similar or like method. The most practical method for the preparation of the sulphurous acid I have found to be, because of the ease in handling the requisite chemicals and from a standpoint of equipment required, the use of sodium bisulfite and sulphuric acid in accordance with the following reaction:

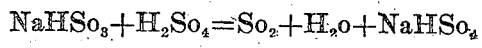

$$NaHSo_3 + H_2So_4 = So_2 + H_2o + NaHSo_4$$

I have discovered that the concentration of this sulphurous acid solution should be for more practical reasons between 0.5% and 6.00% and also that practically the same results are obtained by the use of an 0.5% solution of sulphurous acid as are obtained with a 6% solution. The sulphurous acid is delivered to the drum D through a valved conduit 11. An outlet overflow pipe or conduit 12 having a valve 13 is provided for regulating the level of the fluid within the drum D. The dilute sulphurous acid solution is delivered to a tank 14 or the same may be disposed of. In some cases it may be desirable to save the waste sulphurous acid liquor and by the addition of new sulphur dioxide bring this solution back to the required concentration. The speed of revolution of the drum A is preferably such that the nuts traveling therethrough require from one to three minutes, depending upon their condition of cleanliness prior to their introduction therein.

While I have diagrammatically illustrated a form of apparatus that may be employed for carrying out my invention, it is to be understood that my invention relates to the process of bleaching nuts which comprises first subjecting the nuts to the action of active chlorine and then subjecting the nuts to the action of sulphurous acid and that the same is not dependent upon any particular form of apparatus which may be varied to suit any conditions or operation desired, and further, that my invention is of the scope of the appended claims.

I claim:

1. A process of bleaching nuts comprising immersing the nuts in a solution from which nascent chlorine is being liberated and then immersing the nuts in a solution of sulphurous acid.

2. The process of bleaching nuts consisting of immersing the nuts in a solution from which nascent chlorine is being liberated and then immersing the nuts into a solution of between 0.5% to 6.00% sulphurous acid.

3. The process of bleaching walnuts comprising immersing the nuts in a solution from which nascent chlorine is being liberated, conveying the nuts to a second bleaching chamber, immersing the nuts into a solution of sulphurous acid, and drying the nuts so treated.

4. The process of bleaching nuts which consists in subjecting the nuts to action of a solution in which active chlorine is being liberated for a period of from 1 to 3 minutes, and then subjecting the nuts to the action of sulphur dioxide.

5. A process of bleaching nuts which consists in subjecting the nuts to action of a solution in which active chlorine is being liberated, immersing the nuts in a solution containing sulphurous acid, and drying the nuts without rinsing the sulphurous acid therefrom.

Signed at Berkeley California, this 16th day of April 1925.

ARTHUR W. CHRISTIE.